United States Patent
Sakamoto et al.

(10) Patent No.: US 10,538,046 B2
(45) Date of Patent: Jan. 21, 2020

(54) PNEUMATIC TIRE MANUFACTURING METHOD, AND PNEUMATIC TIRE

(71) Applicant: SUMITOMO RUBBER INDUSTRIES, LTD., Kobe-shi, Hyogo (JP)

(72) Inventors: Masayuki Sakamoto, Kobe (JP); Kenji Ueda, Kobe (JP); Takamichi Sagawa, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 179 days.

(21) Appl. No.: 15/523,575

(22) PCT Filed: Nov. 4, 2015

(86) PCT No.: PCT/JP2015/081045
§ 371 (c)(1),
(2) Date: May 1, 2017

(87) PCT Pub. No.: WO2016/076177
PCT Pub. Date: May 19, 2016

(65) Prior Publication Data
US 2017/0305090 A1 Oct. 26, 2017

(30) Foreign Application Priority Data

Nov. 10, 2014 (JP) .................. 2014-228350

(51) Int. Cl.
*B60C 19/08* (2006.01)
*B29D 30/08* (2006.01)
(Continued)

(52) U.S. Cl.
CPC ............. *B29D 30/30* (2013.01); *B29D 30/32* (2013.01); *B60C 19/08* (2013.01)

(58) Field of Classification Search
CPC ......... B60C 11/0041; B60C 2011/0091; B60C 2011/016; B60C 2013/008; B60C 2013/045
(Continued)

(56) References Cited

U.S. PATENT DOCUMENTS 6,415,833 B1 * 7/2002 Komatsu ................. B60C 19/08
152/152.1
2006/0237112 A1 * 10/2006 Nishitani ............... B29D 30/30
152/524
(Continued)

FOREIGN PATENT DOCUMENTS

CN 101535065 A 9/2009
CN 1990284 B 8/2011
(Continued)

OTHER PUBLICATIONS

Machine Translation: JP-2006346999-A; Hirai, Nobuyuki; (Year: 2018).*

(Continued)

*Primary Examiner* — Kendra Ly
(74) *Attorney, Agent, or Firm* — Birch, Stewart, Kolasch & Birch, LLP

(57) ABSTRACT

A pneumatic tire manufacturing method is provided in which winding collapse is prevented, there is no possibility of adverse effects on the FV, a current-carrying layer can be formed easily, and down-stitching can be dispensed with or minimized in the manufacture of SOT-structure pneumatic tires having a base-pen structure in the tread. This pneumatic tire manufacturing method involves: a step in which a sidewall, an inner liner, and a ply are bonded on a first molding drum, beads are set, and the tread side part that will form the current-carrying layer is formed on the side wall, forming a first cover; a step in which a breaker and band are bonded on a second molding drum and the tread center part (Continued)

is formed on the band, shaping the tread ring; a step in which the first cover is inserted inside of the tread ring and inflated to bond to the tread ring with pressure; and a step in which the sidewall is bonded to the lateral surface of the first cover, and the tread side part and the tread center part are bonded together.

3 Claims, 5 Drawing Sheets

(51) Int. Cl.
  *B29D 30/52* (2006.01)
  *B29D 30/72* (2006.01)
  *B29D 30/30* (2006.01)
  *B29D 30/32* (2006.01)
(58) Field of Classification Search
  USPC ............... 156/130.7, 128.1, 127; 152/209.16
  See application file for complete search history.

(56) References Cited

U.S. PATENT DOCUMENTS

| | | | |
|---|---|---|---|
| 2007/0163690 A1 | 7/2007 | Nobuchika et al. | |
| 2010/0078103 A1 | 4/2010 | Nakamura | |
| 2012/0234448 A1 | 9/2012 | Asayama | |
| 2013/0206321 A1* | 8/2013 | Grashuis | B29D 30/20 156/93 |

FOREIGN PATENT DOCUMENTS

| | | | | |
|---|---|---|---|---|
| CN | 102673323 | B | 9/2015 | |
| EP | 1666236 | A1 | 6/2006 | |
| EP | 2380728 | A1 | 10/2011 | |
| JP | 10338004 | A * | 12/1998 | |
| JP | 11078417 | A * | 3/1999 | |
| JP | 2006346999 | A * | 12/2006 | |
| JP | 2007-176437 | A | 7/2007 | |
| JP | 2012-192876 | A | 10/2012 | |
| JP | 2013-39695 | A | 2/2013 | |
| JP | 2013-188866 | A | 9/2013 | |
| JP | 2014162308 | A * | 9/2014 | ......... B60C 11/0066 |

OTHER PUBLICATIONS

Machine Translation: JP-2014162308-A; Hana Kazutaka; (Year: 2019).*
Machine Translation: JP-11078417-A; Mizutani, Tamotsu; (Year: 2019).*
Machine Translation: JP-10338004-A; Ducci, Stefano; (Year: 2019).*
Japanese Office Action for Japanese Application No. 2014-228350, dated Apr. 11, 2017, with a partial English translation.
International Search Report, issued in PCT/JP2015/081045, dated Dec. 8, 2015.
Written Opinion of the International Searching Authority, issued in PCT/JP2015/081045, dated Dec. 8, 2015.
Author Unknown, "Automobile Engineering Handbook Gerymany version" Beijing, Mechanical Industry Publishing House, Feb. 2012, p. 544 (2 pages total).
Chen, "Automobilism Chart," Beijing, China Forestry Publishing House, Aug. 2013, pp. 269-270 (3 pages total).
Chinese Office Action and Search Report for Chinese Application No. 201580058603.X, dated Oct. 23, 2018, with a partial English translation.
Extended European Search Report for European Application No. 15858985.3, dated Mar. 26, 2018.

* cited by examiner

[FIG.1]
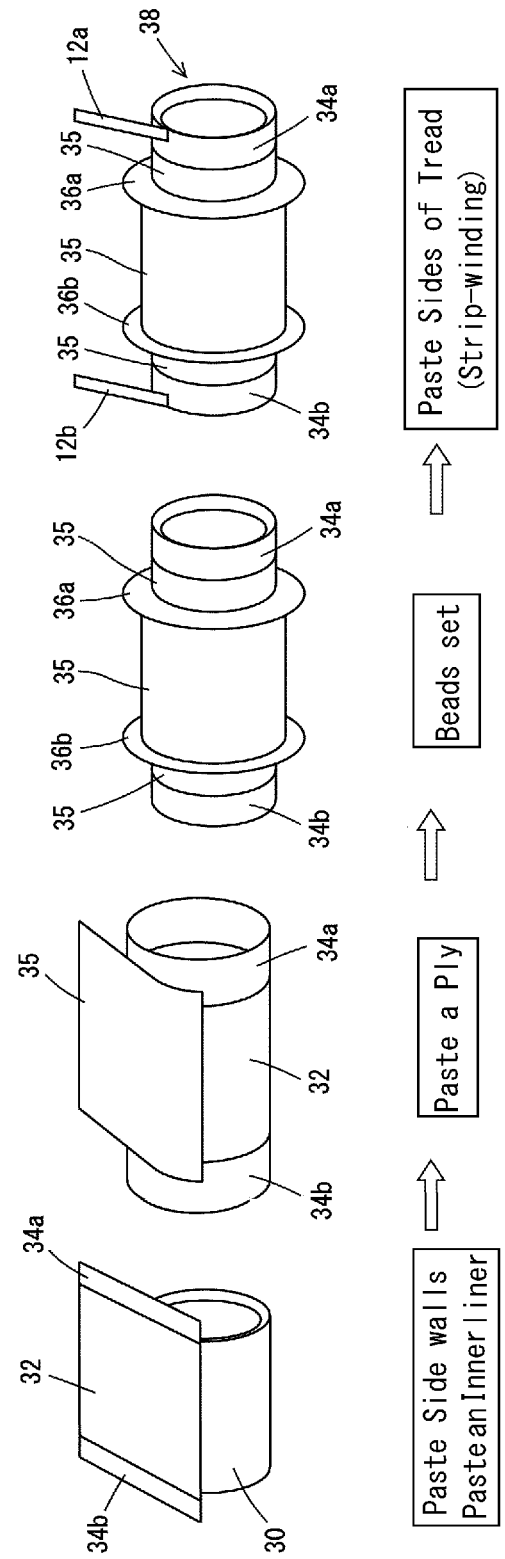

[FIG.2]
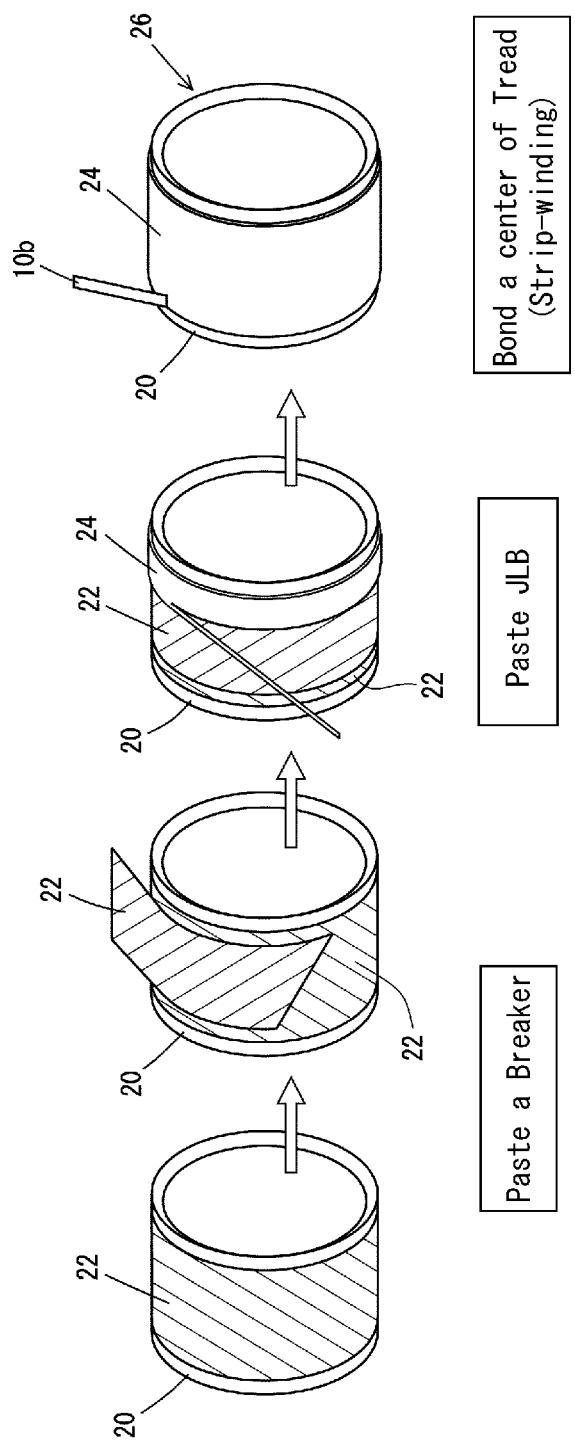

[FIG.3]
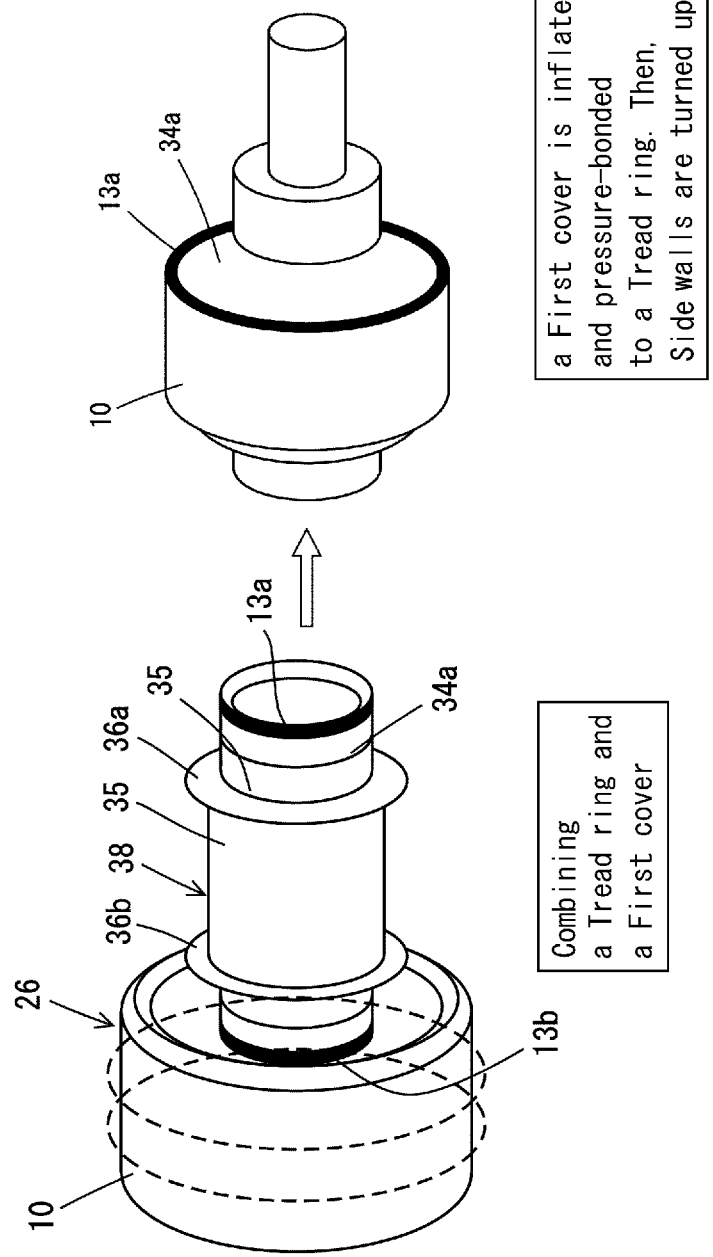

[FIG.4]
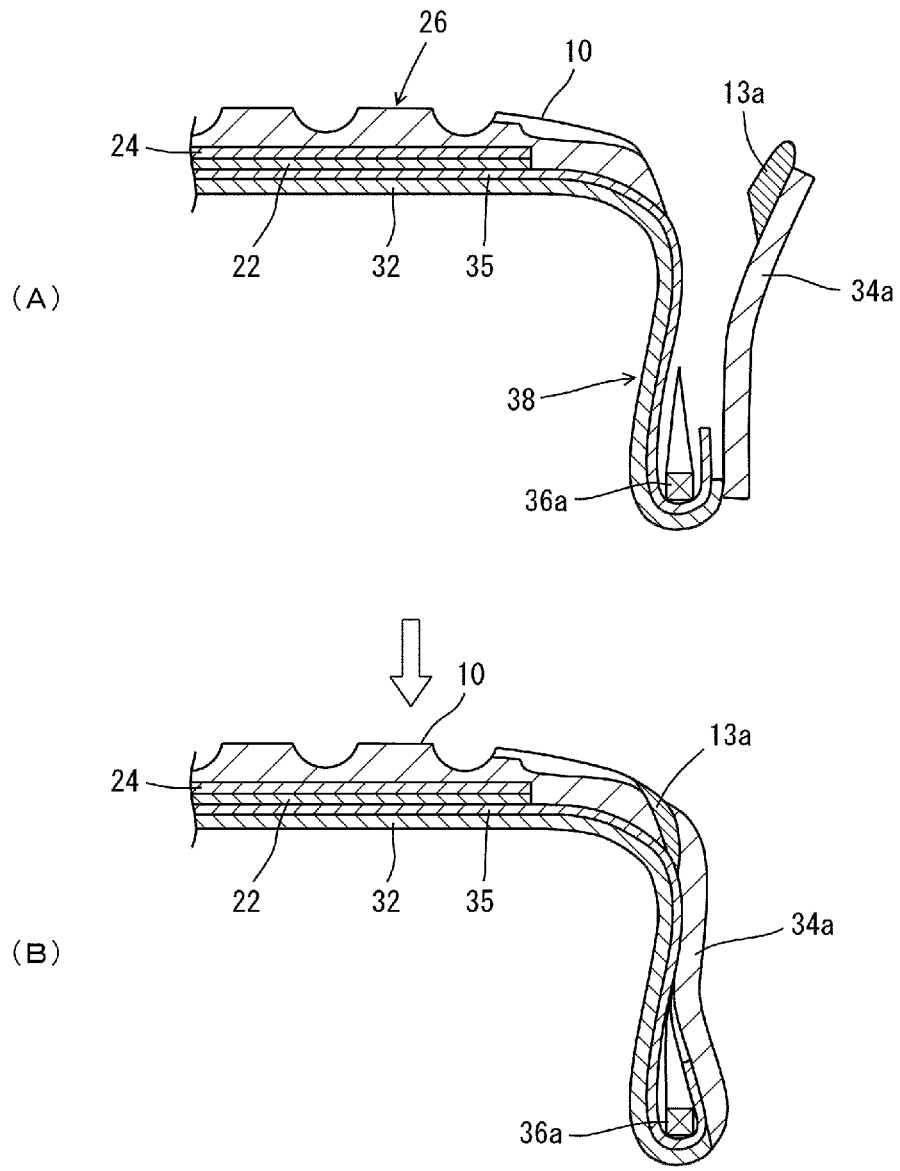
[FIG.5]
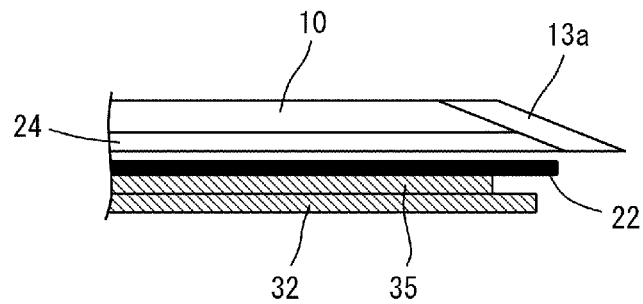

[FIG.6]
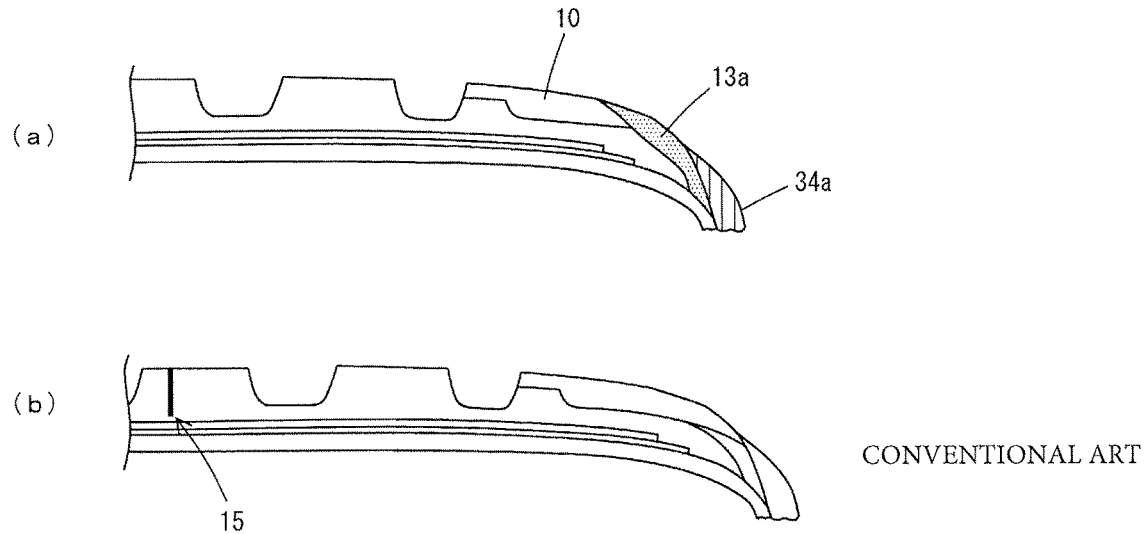
CONVENTIONAL ART
[FIG.7]
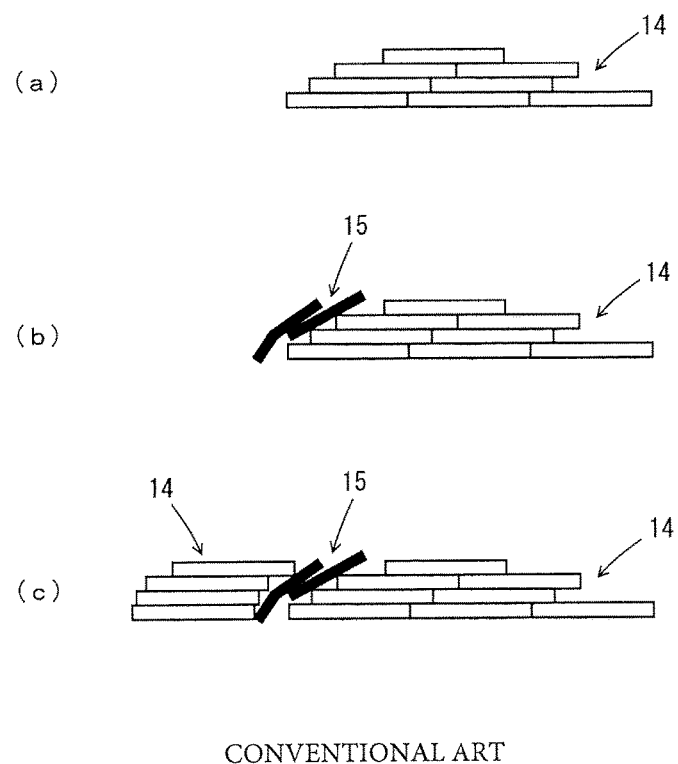
CONVENTIONAL ART

PNEUMATIC TIRE MANUFACTURING METHOD, AND PNEUMATIC TIRE

TECHNICAL FIELD

The present invention relates to a method of manufacturing a pneumatic tire of SOT (Sidewall Over Tread) structure having a conductive layer, and to a pneumatic tire manufactured using said method.

BACKGROUND ART

In manufacturing a pneumatic tire, in order to relieve static electricity accumulated in a vehicle to the ground by ensuring electric conductivity of the tire, a tread having a base pen structure including a conductive layer is used, with ends of the tread covered by sidewalls (SOT structure).

Specifically, first, a sidewall is wrapped on opposite side portions of a first forming drum and, thereafter, on the central portion of the first forming drum, an inner liner and a ply are pasted successively. Then, a pair of beads is set inside the sidewalls, at positions corresponding to the width of the tire product. Thus, the first cover is formed (first cover forming step).

On the other hand, in parallel with the formation of first cover, on a second forming drum, a breaker and a band such as JLB (jointless band) are pasted and thereafter, a tread is wrapped by strip-winding, whereby a tread ring is formed (tread ring forming step).

The above-described tread having the base pen structure is formed in accordance with such process steps as shown in FIG. 7, at the tread ring forming step. First, as shown in FIG. 7(a), rubber strips of a composition having high solid specific resistance are stacked to form a tread layer 14. Thereafter, as shown in FIG. 7(b), rubber having low solid specific resistance is stacked thin along the tread layer 14 to form a conductive layer 15. Then, as shown in FIG. 7(c), a tread layer 14 is again formed on the outer side of conductive layer 15. In this manner, a tread having the base pen structure is formed, ensuring a path to relieve static electricity.

Then, the first cover is inserted to the inside of tread ring, and that portion of the first cover which is between the beads is inflated and pressure-bonded to the tread ring, to form a shape close to that of the low cover (shaping step).

Thereafter, in order that the tread is pressure-bonded to the first cover with no gap left therebetween, sides of tread are pressed by using a stitcher so that the sides extend along a curved side surface of the first cover that has been pressure-bonded to the tread ring (stitch-down step).

Thereafter, the sidewall outer than the bead is turned up toward the side surface of inflated first cover, and the sidewall is pasted to cover the tread end (turn-up step). In this manner, the first cover and the tread ring are integrated and the formation of low cover is completed (for example, see Patent Documents 1, 2).

PRIOR ART DOCUMENT

Patent Document

Patent Document 1: JP-A-2013-39695
Patent Document 2: JP-A-2013-188866

SUMMARY OF THE INVENTION

Problems to be Solved by the Invention

It is not easy, however, to form the conductive layer by stacking rubber having low solid specific resistance thin along the tread layer. Therefore, it has been difficult to prevent, for example, the wound strip from collapsing at the time of stacking, possibly causing significant decrease in productivity. Further, since the conductive layer is formed by stacking rubber strips along the tread layer, the edge portion of rubber strip comes to be the ground contact area, and this may possibly affect FV (force variation).

The above-described stitch-down step, however, is a step of making the tread ring smaller in diameter and thereby to make it extend along the curved first cover. It is not easy to appropriately conduct stitch-down to exhibit desirable tire functions and it also poses a problem in increasing production efficiency.

For example, stitch-down is conducted while rotating the drum, and, therefore, if the speed of rotation is increased, the shape of low cover comes to be nonuniform and it becomes more difficult to maintain shape accuracy. Further, depending on the width of a stitcher roller, defects such as scratches and wrinkles may generate on the tread surface. Low covers as such have to be discarded as defective products and, hence, production efficiency decreases.

Further, stitcher operation for the stitch-down is complicated and hence, the stitcher must have a complicated structure, increasing cost of the equipment.

Therefore, an object of the present invention is to provide a method of manufacturing a pneumatic tire of SOT structure having a tread with base pen structure, capable of preventing collapse of wound strips, not affecting FV, allowing easy formation of the conductive layer, eliminating or minimizing stitching and allowing formation of a low cover having an appropriate base pen structure, as well as to provide a pneumatic tire manufactured through said manufacturing method.

Means of Solving the Problems

The present inventors conducted extensive studies in order to solve the above problems. As a result, it was found that the above problems can be solved by inventions mentioned below, and thus the present invention has been completed.

The invention according to claim 1 provides
a method of manufacturing a pneumatic tire having a sidewall-over-tread structure with the sidewall formed to cover ends of tread having a base pen structure, comprising:

the first cover forming step of wrapping sidewalls on opposite end portions of a first forming drum, pasting an inner liner and a ply on the center of the first forming drum, setting a pair of beads inside said sidewalls, and forming sides of tread by strip-winding using a rubber strip having solid specific resistance of at most $1 \times 10^7$ $\Omega$cm on said sidewalls outer than said beads, and thereby forming a first cover; the tread ring forming step of successively pasting, on a second forming drum, a breaker and a band and then forming a center of tread by strip-winding on said band using a rubber strip having solid specific resistance of at least $1 \times 10^8$ $\Omega$cm, and thereby forming a cylindrical tread ring;

the shaping step of inserting said first cover inside said tread ring, and inflating that portion of said first cover which is between the said beads, and thereby pressure-bonding said tread ring with said first cover to form a shape of a low cover, and the turn-up step of turning said sidewalls outside of said beads toward side surfaces of said inflated first cover and pasting said sidewalls on the side surfaces of said first cover, and bonding said sides of tread on the first cover and said center of tread on said tread ring to form, at least on one shoulder portion, a base pen structure having a conductive layer to be in contact with the ground by the width of at least 1 mm under the standard load.

The invention according to claim 2 provides the method of manufacturing a pneumatic tire according to claim 1, wherein at said turn-up step, said sides of tread of the first cover and said center of tread on said tread ring are bonded, overlapped by at least 5 mm in the axial direction of the tire.

The invention according to claim 3 provides the method of manufacturing a pneumatic tire according to claim 1 or 2, wherein at said turn-up step, a bonding surface of said side of tread of the first cover and said center of the tread on said tread ring is approximately vertical to the outer surface of said tread, or is a tapered surface inclined toward said sidewall from the outer surface of said thread to an inner surface of said tread.

The invention according to claim 4 provides a pneumatic tire which is manufactured using the method of manufacturing a pneumatic tire according to any one of claims 1 to 3.

Effect of the Invention

According to the present invention, in manufacturing a pneumatic tire of SOT structure having the base pen structure in its tread, the conductive layer can easily be formed while preventing collapse of wound strips and not affecting FV, and eliminating stitch-down or minimizing necessity of stitch-down while enabling satisfactory forming of the low cover having a base pen structure, as well as a pneumatic tire manufactured through this method can be provided.

BRIEF DESCRIPTION OF THE DRAWINGS

FIG. 1 Schematic illustrations showing the first cover forming step of the method of manufacturing a pneumatic tire in accordance with an embodiment of the present invention.

FIG. 2 Schematic illustrations showing the tread ring forming step of the method of manufacturing a pneumatic tire in accordance with an embodiment of the present invention.

FIG. 3 Schematic illustrations showing the low cover forming step of the method of manufacturing a pneumatic tire in accordance with an embodiment of the present invention.

FIG. 4 Cross-sectional views schematically showing the turn-up step of the method of manufacturing a pneumatic tire in accordance with an embodiment of the present invention.

FIG. 5 Schematic illustrations showing cross section of the tread portion of low cover manufactured using the method of manufacturing a pneumatic tire in accordance with an embodiment of the present invention.

FIG. 6 A cross-sectional view (a) of the tread portion of a pneumatic tire in accordance with an embodiment of the present invention, and a cross-sectional view (b) of the tread portion of a conventional pneumatic tire.

FIG. 7 A view for explaining a process for forming a base pen structure in a conventional method of manufacturing a pneumatic tire.

EMBODIMENTS FOR CARRYING OUT THE INVENTION

An embodiment of the present invention will be described below specifically with reference to the drawings.

Similar to the conventional method of manufacturing a pneumatic tire, the method of manufacturing a pneumatic tire in accordance with the present invention includes:

the first cover forming step of forming a first cover on a first forming drum; the tread ring forming step of forming a tread ring on a second forming drum;

the shaping step of inserting said first cover to the inside of the tread ring, inflating the first cover and thereby pressure-bonding it with the tread ring to attain approximately the shape of a low cover; and the turn-up step of turning up sidewalls to side surfaces of the first cover and pasting the sidewalls to cover the tread ends.

The method of manufacturing a pneumatic tire in accordance with the present invention is different from the conventional method of manufacturing a pneumatic tire in that the tread is divided to a center of tread and sides of tread, that the center of tread is formed by a rubber strip having high solid specific resistance and the sides of tread are formed by a rubber strip having low solid specific resistance, and that the base pen structure is formed at least on one shoulder portion of the pneumatic tire.

Specifically, the present invention is different from the conventional method of manufacturing a pneumatic tire in that at the first cover forming step, the sides of tread to be conductive layers are formed by strip-winding using a rubber strip having solid specific resistance of at most $1\times10^7$ Ωcm on sidewalls outside a pair of beads, that at the tread ring forming step, the center of tread is formed on a band by strip-winding using a rubber strip having solid specific resistance of at least $1\times10^8$ Ωcm, and that at the turn-up step, the sides of tread are pasted to the center of tread.

Specific processes of the method of manufacturing a pneumatic tire in accordance with an embodiment of the present invention will be described below.

(1) First Cover Forming Step

FIG. 1 includes schematic illustrations showing the first cover forming step of the method of manufacturing a pneumatic tire in accordance with an embodiment of the present invention. As shown in FIG. 1, at the first cover forming step, first, sidewalls (sw) 34a, 34b are wrapped on opposite sides of a first forming drum 30, and then, at the central portion of first forming drum 30, a sheet-shaped inner liner 32 and a ply 35 are pasted.

Next, a pair of beads 36a, 36b is set inner than sidewalls 34a, 34b. The space between the pair of beads 36a, 36b to be set is appropriately selected in accordance with the width of the tire product.

Next, on the sidewalls outside of the pair of beads 36a, 36b, strip-shaped tread rubber materials 12a, 12b having solid specific resistance of at most $1\times10^7$ Ωcm are wound spirally (strip-winding), whereby sides 13a, 13b of tread (see FIG. 3) to be conductive layers after manufacture are formed. Thus, formation of the first cover 38 is completed.

Here, the dimension of the sides 13a, 13b of tread to be formed should preferably be designed such that the side satisfactorily functions as a conductive layer of the pneumatic tire after vulcanization. More specifically, the side should preferably be designed to have such a dimension that the conductive layer is formed deep into the shoulder portion and that the ground contact area of conductive layer under standard load defined by Japan Automobile Tyre Manufacturing Association (JATMA) surely has the width of at least 1 mm.

(2) Tread Ring Forming Step

FIG. 2 includes schematic illustrations showing the tread ring forming step of the method of manufacturing a pneumatic tire in accordance with an embodiment of the present invention. As shown in FIG. 2, at the tread ring forming step, first, two sheet-shaped breakers 22 are wrapped around and pasted on a second forming drum 20 and, thereafter, JLB (jointless band) 24 is formed by strip-winding on the breaker 22.

Next, on JLB 24, strip-shaped tread rubber material 10b having solid specific resistance of at least $1 \times 10^8$ Ωcm is wrapped spirally by strip-winding and thus, a center 10 of tread (see FIG. 3) is formed. Thus, forming of tread ring 26 is completed.

(3) Shaping Step

FIG. 3 includes schematic illustrations showing the shaping step of the method of manufacturing a pneumatic tire in accordance with an embodiment of the present invention. As shown in FIG. 3, at the shaping step, first, the first cover 38 is inserted to the inside of cylindrical tread ring 26 and combined.

Thereafter, the first cover 38 between the beads 36a, 36b is inflated, so that tread ring 26 and the first cover 38 are pressure-bonded, and the resulting body as a whole is formed to have the shape of a low cover.

(4) Turn-Up Step

FIG. 4 includes schematic illustrations showing the turn-up step of the method of manufacturing a pneumatic tire in accordance with an embodiment of the present invention, depicting a side where a base pen structure is formed, i.e. right-half of a structure. At the turn-up step, as shown in FIG. 4(A), sidewall 34a outside bead 36a is turned up and pasted to a side surface of inflated first cover 38 and, as shown in FIG. 4(B), the side 13a of tread on the first cover 38 and the center 10 of tread on tread ring 26 are bonded together, and thus, formation of the low cover of pneumatic tire of the SOT structure having a base pen structure is completed.

In the foregoing, it is preferred that the side 13a and the center 10 of tread are bonded appropriately overlapped in the axial direction of the tire, as shown in FIG. 5. Specifically, overlapping by at least 5 mm is preferred.

The bonding surface between the side 13a and the center 10 of tread should preferably be a substantially vertical surface, or be a tapered surface, tapered from the upper surface side to the inner surface side of the tread, inclined to the sidewall.

(5) Vulcanizing Step

Then, the low cover made in this manner is vulcanized by a tire-vulcanizer and a pneumatic tire is manufactured. At this time, a side 13a of tread and the center 10 of tread that have been bonded together are integrated by pressure during vulcanization. Thus, the tread is formed and the base pen structure with the conductive layer is formed at a shoulder portion formed by the side 13a of tread, at the same time.

Therefore, by using the method of manufacturing a pneumatic tire in accordance with the present embodiment, a pneumatic tire having the SOT structure can appropriately be manufactured without necessitating the conventional stitch-down step.

Here, the dimension of side 13a of tread and the amount of turn-up at the turn-up step are adjusted appropriately, so that when the manufactured pneumatic tire is mounted on a vehicle, the conductive layer formed at the shoulder portion comes to be in contact with the ground by the width of at least 1 mm under the standard load.

If the bonding surface between the side 13a and the center 10 of tread is approximately vertical or tapered as described above, a base pen structure having the conductive layer reaching the bottom portion of the shoulder portion can be formed in the vulcanizing step and, hence, even when the pneumatic tire wears off, the above-mentioned width of conductive layer can be ensured. Thus, the effect of conduction can reliably be maintained.

(6) Effects of the Embodiment

In the present embodiment, as shown in FIG. 6(a), at the shoulder portion between the center 10 of tread having high solid specific resistance and a side wall 34a, a base pen structure having the conductive layer formed of side 13a of tread having low solid specific resistance is formed. Therefore, different from the conventional method in which the base pen structure is formed near the center of tread by stacking thin rubber having low solid specific resistance along the tread as shown in FIG. 6(b), the base pen structure can easily and reliably be formed.

Specifically, in the conventional technique, at least two end portions of a strip, that is, beginning and end portions of winding a rubber strip for forming the base pen are positioned on the ground contact area, and a step of the edge portion of stacked rubber strip may possibly affect FV.

In contrast, according to the present embodiment, since the base pen structure having the conductive layer is formed at the shoulder portion, as described above, the beginning (end) portion of the rubber strip for forming the base pen structure can be arranged on the sidewall portion. As a result, the number of end portions of the strip that is exposed at the ground contact area can be reduced by one from the conventional art.

Further, different from the conventional example, it is unnecessary to form the base pen structure at the tread layer. Therefore, it is unnecessary to form an approximately triangular portion in the tread layer. As a result, it becomes possible to wind the rubber strip for forming the tread layer with its beginning or end portion not exposed at the ground contact area. Accordingly, different from the conventional example, the edge portion of the stacked rubber strip will not be the ground contact area and, hence, undesirable influence to FV can be prevented.

Assume that the base pen structure is provided on one shoulder portion and one side of the pneumatic tire lifts off from the ground at the time of cornering, for example. Even in that situation, the base pen of either the left or right tire would be in contact with the ground and electrically conductive state can be maintained if the contact width of base pen structure is made 5 mm or larger. Further, providing the base pen structure on both shoulder portions is preferred, since the effect of electric conduction can more reliably be exhibited.

According to the present embodiment, the shoulder portion of the pneumatic tire can be used as the conductive layer and, therefore, by adjusting the composition of the rubber strip for forming the side 13a of tread to the composition specialized for RRC (Rolling Resistance Coefficient) of the tire, it becomes possible to reduce heat build-up at the shoulder portion, which affect RRC, and thereby to improve fuel economy of the pneumatic tire.

In addition to the above-described effects attained by the formation of base pen structure, the present embodiment can also solve various problems experienced in connection with the adoption of stitch-down step in the conventional pneumatic tire manufacturing method.

As described above, during the stitch-down in the conventional pneumatic tire manufacturing method, the tread ring is made smaller in diameter by compressing rubber while the drum is being rotated, so as to make the tread extend along the first cover. Therefore, if the speed of rotation is increased, the shape of low cover comes to be nonuniform and it becomes more difficult to maintain shape accuracy.

If the tread is pulled during the stitch-down, bonding position between the tread and the first cover may possibly deviate. If the tread rubber has high stiffness, this tendency becomes more noticeable.

Further, depending on the width of stitcher roller, it may slip over the tread surface, possibly causing scratches or wrinkles on the tread surface.

The low cover having such a problem must be discarded as a defective product, as described above, since such deficiencies affect tire performance such as FV (Force Variation).

If the tread rubber has low stickiness, wound strips may possibly collapse at the time of stitch-down, making formation of the low cover itself difficult.

In contrast, according to the present embodiment, the tread is formed separately as a center and sides of tread, the center is formed on the tread ring and the sides are formed on the first cover, and the center and sides are bonded simultaneously with the turn-up of the first cover, as described above.

As a result, it becomes possible to eliminate or minimize stitch-down, and therefore, the above-described problems such as nonuniform shape of the low cover can be prevented. Thus, the shape of low cover can be maintained with high accuracy, and a pneumatic tire having stable tire performance such as FV can be manufactured with high efficiency. Therefore, production efficiency can be improved.

Further, in the present embodiment, the center of tread is formed to have the width substantially the same as the breaker or the band, and the sides of tread that have been subjected to stitch-down are formed on the first cover. Therefore, unlike the conventional method, the difficulty of bending rubber of high stiffness along the first cover and pasting it thereon can be avoided. As a result, the first cover and the tread ring can reliably be integrated regardless of the length or gauge of the tread, and low covers of high quality can be manufactured stably with high reproducibility.

An end of the tread entering a buttress portion of a pneumatic tire has, depending on its hardness, an influence on steering stability as well as RRC (Rolling Resistance Coefficient) of a vehicle when the tire is mounted. According to the present embodiment, the length or gauge of the tread can freely be set and, therefore, such performances can appropriately be attained.

EXAMPLES

1. Formation of Test Samples

For each of Examples 1 to 4, 100 pneumatic tires having the SOT structure of the size 255/40R18 were formed in accordance with the above-described embodiment, with the side of tread formed by using rubber strips having solid specific resistance of at most $1 \times 1 \times 10^7$ Ωcm, and the width of ground contact area of the conducive layer under standard load varied as shown in Table 1. In Example 4, the conductive layer was formed only on one side.

For comparison, samples were also formed for Comparative Example 1 in which the base pen structure was not formed, and Comparative Example 2 in which the base pen structure was formed by the conventional method. Further, samples were also formed for Comparative Example 3 in which the width of ground contact area of the conductive layer under standard load was set to 0.5 mm, and for Comparative Example 4 in which the solid specific resistance of the conductive layer exceeded $1 \times 10^7$ Ωcm.

In Example 4, stitch-down was conducted using a stitcher, and in Examples 1-3, stitch-down was not conducted.

2. Evaluation (1) RCC, Braking Index, Abrasion Index, Conductivity

The formed pneumatic tire samples were mounted on 1.4 L FF vehicles, in-vehicle test runs with one occupant were conducted to measure RCC, braking index, abrasion index and conductivity, and the results were evaluated. RCC, braking index and abrasion index were relatively evaluated with Comparative Example 1 being 100. The higher index indicates higher performance. Further, if conductivity was exhibited, it is indicated as "OK" and if not, "NG."

The methods of evaluating RCC, braking index, abrasion index and conductivity are as follows.

RCC: in compliance with ISO 280580

Braking index: in compliance with JNCAP brake test standard

Abrasion index: wear resistance after running 20000 km on a prescribed evaluation route was evaluated Presence/absence of conductivity: considering the state actually mounted on a vehicle, 2 degrees of camber was imposed on a base, and electric resistance was measured under 70% of L/I maximum load.

(2) Productivity Index

The time necessary for forming the low cover of each sample was measured, and relatively evaluated as a ratio with the time of Comparative example 1 being 100. The higher index indicates longer time for formation and hence, lower productivity.

(3) RFV OA

Overall RFV (Radial Force Variation) of each manufactured pneumatic tire was measured, and evaluated as a ratio with the value of Comparative example 1 being 100. The lower index indicates better RFV.

(4) Frequency of Collapse of Wound Strips

When the low cover of each sample was formed, if the strip-shaped tread material (rubber strip) was collapsed or not was visually inspected, and the rate (frequency) of collapse was counted for each example.

(5) Variation in Tread Edge Position (R)

Formed pneumatic tires were visually inspected, and deviation of tread edge position from the design value was measured. The average value was calculated as the variation (R, unit: mm) of the tread edge position.

The result of each of evaluations are shown in Table 1. In Table 1, if the solid specific resistance of the conductive layer was $1 \times 10^7$ Ωcm or lower, it is indicated as "OK", and if it exceeded $1 \times 10^7$ Ωcm, it is indicated as "NG."

TABLE 1

| | Comparative Example | | | | Example | | | |
|---|---|---|---|---|---|---|---|---|
| | 1 | 2 | 3 | 4 | 1 | 2 | 3 | 4 |
| Stitch-down | done | done | Not done | Not done | Not done | Not done | Not done | done |
| Width of conductive layer contact area (mm) | 0 | 1.0 base pen | 0.5 | 1.0 | 1.0 | 5.0 | 10.0 | 5.0 one side only |
| Solid specific resistance of conductive layer ($\leq 1 \times 10^7$ Ωcm) | — | OK | OK | NG | OK | OK | OK | OK |
| RCC | 100 | 100 | 101 | 102 | 104 | 108 | 118 | 106 |
| Braking index | 100 | 101 | 99 | 99 | 98 | 97 | 90 | 92 |
| Abrasion index | 100 | 99 | 100 | 100 | 101 | 105 | 110 | 107 |
| Conductivity | NG | OK | NG | NG | OK | OK | OK | OK |
| Productivity index (fabrication time) | 100 | 131 | 28 | 34 | 35 | 34 | 34 | 31 |
| RFV OA (ratio) | 100 | 83 | 72 | 79 | 68 | 81 | 86 | 83 |
| Frequency of collapse of wound strips (%) | 5 | 3 | 0 | 0 | 0 | 0 | 0 | 0 |
| Variation of tread edge position (R) (mm) | 5 | 5 | 2 | 2 | 2 | 2 | 2 | 2 |

From Table 1, it can be seen that when the low cover was formed by the conventional method, the productivity index increased for forming the base pen structure (comparison between Comparative Examples 1 and 2), whereas when the low cover was formed in accordance with the present embodiment (Examples 1 to 4, Comparative Examples 3, 4), the productivity index became very small. From these results, it is understood that by employing the present embodiment, the low cover can be formed in a very short time period as compared with the conventional examples.

Further, when the width of ground contact area of the conductive layer was 1.0 mm or wider and the solid specific resistance of the conductive layer was $1 \times 10^7$ Ωcm or smaller, it was possible to ensure electric conductivity and to improve RRC, abrasion index and RFV, while reducing decrease in braking index. Further, the width of 5 mm was sufficient to ensure electric conductivity by either one of the left and right tires.

Further, in any of the Examples, the frequency of collapse of strips was lower than the conventional example. Thus, it can be understood that the pneumatic tire can be manufactured with higher efficiency than the conventional example. Further, in any of the Examples, collapse of strips did not occur at all, and pneumatic tires could be formed reliably.

Further, in any of the Examples, variation of tread edge position was small, and it was confirmed that pneumatic tires having superior tire performance could be manufactured with high reproducibility.

The present invention has been described above with reference to the embodiments. However, the present invention is not limited to said embodiments. Various changes may be made on said embodiments within the scope identical or equivalent to that of the present invention.

DESCRIPTION OF THE REFERENCE NUMERALS

10 Center of tread
10b, 12a, 12b Rubber Strip
13a, 13b Side of tread
14 Tread layer
15 Conductive layer
20 Second forming drum
22 Breaker
24 JLB (jointless band)
26 Tread ring
30 First forming drum
32 Inner liner
34a, 34b Sidewall (sw)
35 Ply
36a, 36b Bead
38 First cover

What is claimed is:

1. A method of manufacturing a pneumatic tire having a sidewall-over-tread structure with a sidewall formed to cover ends of a tread having a base pen structure, comprising:
   a first cover forming step of wrapping sidewalls on opposite end portions of a first forming drum, pasting an inner liner and a ply on the center of the first forming drum, setting a pair of beads inside said sidewalls, and forming sides of a tread by strip-winding using a rubber strip having solid specific resistance of at most $1 \times 10^7$ Ωcm on said sidewalls outer from said beads, and thereby forming a first cover;
   a tread ring forming step of successively pasting, on a second forming drum, a breaker and a band and then forming a center of tread by strip-winding on said band using a rubber strip having solid specific resistance of at least $1\times10^8$ Ωcm, and thereby forming a cylindrical tread ring;

a shaping step of inserting said first cover inside said tread ring, and inflating that portion of said first cover which is between the said beads, and thereby pressure-bonding said tread ring with said first cover to form a shape of a low cover, and a turn-up step of turning said sidewalls outside of said beads toward side surfaces of said inflated first cover and pasting said sidewalls on the side surfaces of said first cover, and bonding said sides of tread on the first cover and said center of tread on said tread ring to form, at least on one shoulder portion, the base pen structure having a conductive layer to be in contact with a ground by the width of at least 1 mm under a standard load.

2. The method of manufacturing a pneumatic tire according to claim 1, wherein at said turn-up step, said sides of tread of the first cover and said center of tread on said tread ring are bonded, overlapped by at least 5 mm an axial direction of the tire.

3. The method of manufacturing a pneumatic tire according to claim 1, wherein at said turn-up step, a bonding surface of said sides of tread of the first cover and said center of the tread on said tread ring is approximately vertical to an outer surface of said tread, or is a tapered surface inclined toward said sidewall from the outer surface of said tread to an inner surface of said tread.

* * * * *